US011508529B2

(12) United States Patent
Sungail et al.

(10) Patent No.: US 11,508,529 B2
(45) Date of Patent: *Nov. 22, 2022

(54) ANODES CONTAINING SPHERICAL POWDER AND CAPACITORS

(71) Applicant: Global Advanced Metals USA, Inc., Wellesley Hills, MA (US)

(72) Inventors: Craig M. Sungail, Chadds Ford, PA (US); Aamir Dawood Abid, Spring City, PA (US)

(73) Assignee: GLOBAL ADVANCED METALS USA, INC., Wellesley Hills, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/177,230

(22) Filed: Feb. 17, 2021

(65) Prior Publication Data

US 2021/0175024 A1 Jun. 10, 2021

Related U.S. Application Data

(63) Continuation of application No. 16/286,998, filed on Feb. 27, 2019, now Pat. No. 10,943,744.

(Continued)

(51) Int. Cl.
*B22F 9/04* (2006.01)
*C25D 11/26* (2006.01)
(Continued)

(52) U.S. Cl.
CPC ........... *H01G 9/0525* (2013.01); *B22F 1/052* (2022.01); *B22F 1/065* (2022.01); *B22F 1/142* (2022.01); *H01G 9/00* (2013.01); *H01G 9/0029* (2013.01); *H01G 9/042* (2013.01); *H01G 11/00* (2013.01); *B22F 9/04* (2013.01);

*B22F 2201/10* (2013.01); *B22F 2301/20* (2013.01); *B22F 2998/10* (2013.01); *B22F 2999/00* (2013.01);
(Continued)

(58) Field of Classification Search
CPC .. H01G 2009/05; H01G 9/042; H01G 9/0525; H01G 9/0029; H01G 9/15; C25D 11/26; B22F 9/04; B22F 1/085; B22F 1/0048
USPC .................... 361/523, 528, 529; 75/255, 369
See application file for complete search history.

(56) References Cited

U.S. PATENT DOCUMENTS 2,950,185 A 8/1960 Hellier et al.
3,767,456 A 10/1973 Glaski
(Continued)

FOREIGN PATENT DOCUMENTS

CN 102847934 A 1/2013
CN 108500281 A 9/2018
(Continued)

OTHER PUBLICATIONS

International Search Report and Written Opinion issued in corresponding International Patent Application No. PCT/US2019/019721 dated Jun. 11, 2019 (16 pages).
(Continued)

*Primary Examiner* — Arun Ramaswamy
(74) *Attorney, Agent, or Firm* — Kilyk & Bowersox, P.L.L.C.

(57) ABSTRACT

Anodes made from powder, such as tantalum powder, that is highly spherical is described. Methods to make the anodes are further described.

47 Claims, 1 Drawing Sheet

Related U.S. Application Data (60) Provisional application No. 62/793,418, filed on Jan. 17, 2019, provisional application No. 62/693,464, filed on Jul. 3, 2018, provisional application No. 62/638,328, filed on Mar. 5, 2018.

(51) Int. Cl.
| | |
|---|---|
| *H01G 9/052* | (2006.01) |
| *H01G 9/00* | (2006.01) |
| *H01G 9/042* | (2006.01) |
| *H01G 9/04* | (2006.01) |
| *H01G 11/00* | (2013.01) |
| *B22F 1/052* | (2022.01) |
| *B22F 1/065* | (2022.01) |
| *B22F 1/142* | (2022.01) |
| *H01G 9/025* | (2006.01) |

(52) U.S. Cl.
CPC ............. *C25D 11/26* (2013.01); *H01G 9/025* (2013.01); *H01G 2009/05* (2013.01)

(56) References Cited

U.S. PATENT DOCUMENTS

| | | | |
|---|---|---|---|
| 3,829,310 A | 8/1974 | Mahy | |
| 3,974,245 A | 8/1976 | Cheney et al. | |
| 4,062,678 A | 12/1977 | Dreyer et al. | |
| 4,067,736 A | 1/1978 | Vartanian | |
| 4,149,876 A | 4/1979 | Rerat | |
| 4,684,399 A | 8/1987 | Bergman et al. | |
| 4,805,704 A | 2/1989 | Kobashi et al. | |
| 4,940,490 A | 7/1990 | Fife et al. | |
| 4,945,452 A | 7/1990 | Sturmer et al. | |
| 5,200,595 A | 4/1993 | Boulos et al. | |
| 5,211,741 A | 5/1993 | Fife | |
| 5,217,526 A | 6/1993 | Fife | |
| 5,234,491 A | 8/1993 | Chang | |
| 5,242,481 A | 9/1993 | Kumar | |
| 5,245,514 A | 9/1993 | Fife et al. | |
| 5,306,462 A | 4/1994 | Fife | |
| 5,412,533 A | 5/1995 | Murayama et al. | |
| 5,448,447 A | 9/1995 | Chang | |
| 5,498,446 A | 3/1996 | Axelbaum et al. | |
| 5,580,367 A | 12/1996 | Fife | |
| 5,580,516 A | 12/1996 | Kumar | |
| 5,837,121 A | 11/1998 | Kinard et al. | |
| 5,935,408 A | 8/1999 | Kinard et al. | |
| 5,993,513 A | 11/1999 | Fife | |
| 6,051,044 A | 4/2000 | Fife | |
| 6,072,694 A | 6/2000 | Hahn et al. | |
| 6,136,176 A | 10/2000 | Wheeler et al. | |
| 6,162,345 A | 12/2000 | Kinard et al. | |
| 6,191,013 B1 | 2/2001 | Hahn et al. | |
| 6,312,642 B1 | 11/2001 | Fife | |
| 6,322,912 B1 | 11/2001 | Fife | |
| 6,328,927 B1 | 12/2001 | Lo et al. | |
| 6,338,816 B1 | 1/2002 | Fife | |
| 6,348,113 B1 | 2/2002 | Michaluk et al. | |
| 6,373,685 B1 | 4/2002 | Kimmel et al. | |
| 6,375,704 B1 | 4/2002 | Habecker et al. | |
| 6,391,275 B1 | 5/2002 | Fife | |
| 6,416,730 B1 | 7/2002 | Fife | |
| 6,420,043 B1 | 7/2002 | Fife et al. | |
| 6,462,934 B2 | 10/2002 | Kimmel et al. | |
| 6,527,937 B2 | 3/2003 | Fife | |
| 6,551,377 B1 | 4/2003 | Leonhardt | |
| 6,558,447 B1 | 5/2003 | Shekhter et al. | |
| 6,576,099 B2 | 6/2003 | Kimmel et al. | |
| 6,582,641 B1 | 6/2003 | Lo et al. | |
| 6,616,623 B1 | 9/2003 | Kutushov | |
| 6,639,787 B2 | 10/2003 | Kimmel et al. | |
| 6,643,121 B1 | 11/2003 | Huntington | |
| 6,699,757 B1 | 3/2004 | Hwang | |
| 6,699,767 B1 | 3/2004 | Huntington | |
| 6,759,026 B2 | 7/2004 | Kimmel et al. | |
| 6,770,154 B2 | 8/2004 | Koenigsmann et al. | |
| 6,788,523 B1 | 9/2004 | Hossick-Schott et al. | |
| 6,804,109 B1 | 10/2004 | Hahn et al. | |
| 6,813,140 B1 | 11/2004 | Huntington | |
| 6,849,292 B1 | 2/2005 | Huntington | |
| 6,870,727 B2 | 3/2005 | Edson et al. | |
| 6,896,782 B2 | 5/2005 | Melody et al. | |
| 7,081,148 B2 | 7/2006 | Koenigsmann et al. | |
| 7,172,985 B2 | 2/2007 | Pinceloup et al. | |
| 7,190,571 B2 | 3/2007 | Heusmann et al. | |
| 7,220,397 B2 | 5/2007 | Kimmel et al. | |
| 7,241,436 B2 | 7/2007 | Fife | |
| 7,442,227 B2 | 10/2008 | Rosen et al. | |
| 7,445,679 B2 | 11/2008 | Koenitzer et al. | |
| 7,445,762 B2 | 11/2008 | Fife | |
| 7,485,198 B2 | 2/2009 | Michaluk | |
| 7,515,397 B2 | 4/2009 | Reed et al. | |
| 7,572,315 B2 | 8/2009 | Boulos et al. | |
| 7,601,296 B2 | 10/2009 | Michaluk et al. | |
| 7,655,214 B2 | 2/2010 | Reed et al. | |
| 7,803,235 B2 | 9/2010 | Venigalla | |
| 8,040,060 B2 | 10/2011 | Fukasawa et al. | |
| 8,110,172 B2 | 2/2012 | Reed et al. | |
| 8,168,118 B2 | 5/2012 | Michaluk et al. | |
| 8,657,915 B2 | 2/2014 | Mizusaki et al. | |
| 9,725,793 B2 | 8/2017 | Aimone et al. | |
| 9,957,592 B2 | 5/2018 | Aimone et al. | |
| 10,413,427 B2 | 9/2019 | Trieu | |
| 10,422,025 B2 | 9/2019 | Aimone et al. | |
| 2003/0230167 A1 | 12/2003 | Loeffelholz et al. | |
| 2007/0068341 A1* | 3/2007 | Cheng ................. H01G 9/0525 75/255 |
| 2009/0214378 A1 | 8/2009 | Haas et al. | |
| 2011/0170238 A1 | 7/2011 | Schnitter et al. | |
| 2011/0308965 A1 | 12/2011 | Rasheed et al. | |
| 2013/0327571 A1 | 12/2013 | Andrzejak | |
| 2014/0355178 A1 | 12/2014 | Naito | |
| 2015/0162172 A1 | 6/2015 | Lo et al. | |
| 2015/0292081 A1 | 10/2015 | Hogan et al. | |
| 2016/0064150 A1 | 3/2016 | Haas et al. | |
| 2017/0232509 A1 | 8/2017 | Yang et al. | |
| 2017/0283916 A1* | 10/2017 | Maeshima ................ B22F 3/10 |
| 2018/0158610 A1 | 6/2018 | Inoue et al. | |
| 2019/0272958 A1 | 9/2019 | Sungail et al. | |
| 2020/0046510 A1 | 2/2020 | Maale | |
| 2020/0046512 A1 | 2/2020 | Newman et al. | |
| 2020/0048746 A1 | 2/2020 | Aimone et al. | |

FOREIGN PATENT DOCUMENTS

| | | |
|---|---|---|
| EP | 0528974 B1 | 7/1997 |
| JP | 2005336617 A | 12/2005 |
| JP | 2012503343 A | 2/2012 |
| JP | 2017150081 A | 8/2017 |
| WO | 2017026316 A1 | 2/2017 |
| WO | 2017048199 A1 | 3/2017 |
| WO | 2018050473 A1 | 3/2018 |
| WO | 2019197376 A1 | 10/2019 |

OTHER PUBLICATIONS

Liu et al., "Spheroidization of molybdenum powder by radio frequency thermal plasma," International Journal of Minerals, Metallurgy and Materials, vol. 22, No. 11, 2015, pp. 1212-1218.
Webb, P., "Volume and Density Determinations for Particle Technologists," XP-002495931, Retrieved from the Internet: URL:http://www.micromeritics.com/pdf/app_articles/density_determinations.pdf, 2001, 15 pages.
Office Action issued in corresponding Japanese Patent Application No. 2020-546439 dated Oct. 18, 2021 (with English translation) (12 pages).
Strauss et al., "Investigation of Using Laser-Beam Powder-Bed-Fusion With a Mixture of Powders to Achieve In-Situ Alloying," vol. 55, No. 2, 2019, pp. 43-50 (8 pages).
Nanyang Technological University, Singapore, Tech Offers "Novel Titanium based alloy for better orthopaedic implants," https://sc3dp.

(56) References Cited

OTHER PUBLICATIONS ntu.edu.sg/Research/Tech-Offers/Pages/Novel-titanium-based-alloy-for-better-orthopaedic-implants.aspx, Feb. 25, 2020, (2 pages).
Zi et al., Materials Science and Technology, "Spheroidisation of tungsten powder by radio frequency plasma for selective laser melting", vol. 34, No. 6, 2017, pp. 735-742.
Francis, Academic Press, "Materials processing: a unified approach to processing of metals, ceramics and polymers", Chapter 5, Powder Processes, pp. 343-414 (2015).
U.S. Appl. No. 16/286,683, filed Feb. 27, 2019 (64 pages).
U.S. Appl. No. 16/286,842, filed Feb. 27, 2019 (64 pages).
Alec, "Researchers use titanium-tantalum alloy to improve stress absorption of 3D printed implants," 3D printer and 3D printing news, 2016.
Barr et al., "Processing Salt-encapsulated Tantalum Nanoparticles for High Purity, Ultra High Surface Area Applications," Journal Nanoparticles Research, 2006, vol. 8, pp. 11-22.
Boulos, "Plasma power can make better powders," Elsevier Ltd., 2004, vol. 59, Issue 5, pp. 16-21.
Yang et al., "Control of the Nano-Particle Weight Ratio in Stainless Steel Micro and Nano Powders by Radio Frequency Plasma Treatment," Metals, 2015, vol. 5, pp. 2058-2069.
Yang et al., "Preparation of Spherical Titanium Powders from Polygonal Titanium Hydride Powders by Radio Frequency Plasma Treatment," Materials Transactions, 2013, vol. 54, No. 12, pp. 2313-2316.
Www.globaladvancedmetals.com/our-products/additive-manufacturing.aspx (2018).
Office Action issued in corresponding Korean Patent Application 10-2022-7013058 dated Jul. 26, 2022 (with English translation) (14 pages).

\* cited by examiner

ANODES CONTAINING SPHERICAL POWDER AND CAPACITORS

This application is a continuation of U.S. Patent application Ser. No. 16/286,998, filed Feb. 27, 2019, which in turn claims the benefit under 35 U.S.C. § 119(e) of prior U.S. Provisional Patent Application No. 62/638,328, filed Mar. 5, 2018; U.S. Provisional Patent Application No. 62/693,464, filed Jul. 3, 2018; and U.S. Provisional Patent Application No. 62/793,418, filed Jan. 17, 2019, which are incorporated in their entireties by reference herein.

BACKGROUND OF THE INVENTION

The present invention relates to anodes and capacitors, and in particular, relates to anodes made from powders, such as tantalum, wherein the powder is or includes a spherical powder that is a metal or metal oxide. The present invention further relates to methods of making the anodes and capacitors.

Among its many applications, valve metal powder, such as tantalum powder, is generally used to produce capacitor electrodes.

Currently, for example, tantalum powders are generally produced via one of two methods: a mechanical process or a chemical process. The mechanical process includes the steps of electron beam melting of tantalum to form an ingot, hydriding the ingot, milling the hydride, and then dehydriding, crushing, and heat treating. This process generally produces powder with high purity.

The other generally utilized process for producing tantalum powder is a chemical process. Several chemical methods for producing tantalum powders are known in the art. U.S. Pat. No. 4,067,736, issued to Vartanian, and U.S. Pat. No. 4,149,876, issued to Rerat, relate to the chemical production process involving sodium reduction of potassium fluorotantalate ($K_2TaF_7$). A review of typical techniques is also described in the background sections of U.S. Pat. No. 4,684,399, issued to Bergman et al., and U.S. Pat. No. 5,234,491, issued to Chang. All patents and publications are incorporated in their entirety by reference herein.

Tantalum powders produced by chemical methods, for example, are well-suited for use in capacitors because they generally have larger surface areas than powders produced by mechanical methods. The chemical methods generally involve the chemical reduction of a tantalum compound with a reducing agent. Typical reducing agents include hydrogen and active metals such as sodium, potassium, magnesium, and calcium. Typical tantalum compounds include, but are not limited to, potassium fluorotantalate ($K_2TaF_7$), sodium fluorotantalate ($Na_2TaF_7$), tantalum pentachloride ($TaCl_5$), tantalum pentafluoride ($TaF_5$), and mixtures thereof. The most prevalent chemical process is the reduction of $K_2TaF_7$ with liquid sodium.

In the chemical reduction of a valve metal powder, such as tantalum powder, potassium fluorotantalate is recovered, melted, and reduced to tantalum metal powder by sodium reduction. Dried tantalum powder can then be recovered, and optionally thermally agglomerated under vacuum to avoid oxidation of the tantalum and crushed. As the oxygen concentration of the valve metal material can be important in the production of capacitors, the granular powder typically is then deoxidized at elevated temperatures (e.g., up to about 1000° C. or higher) in the presence of a getter material, such as an alkaline earth metal (e.g., magnesium), that has a higher affinity for oxygen than the valve metal. A post-deoxidation process acid leaching conducted under normal atmospheric conditions (e.g., approximately 760 mm Hg) can be performed using a mineral acid solution including, for example, sulfuric acid or nitric acid, to dissolve metal and refractory oxide contaminants (e.g., magnesium and magnesium oxide contaminants) before the material is further processed. The acid leached powders are washed and dried, and may then be compressed, sintered, and anodized in conventional manners to make sintered porous bodies, such as anodes for capacitors.

Most of the efforts in developing tantalum powders has been driven by the capacitor anode industry, where powders were made for this specific purpose only.

Currently, there is a lot of interest in forming anodes by additive manufacturing using metal powders that are designed for use in additive manufacturing or 3D printing. However, to produce anodes on a large scale by additive manufacturing would require many 3D printers and the speed of 'printing' such anodes is not fast. Thus, to produce anodes by 3D printing or additive manufacturing technology will be or is expensive and time consuming and is likely not to address the inventory demands in the industry. Accordingly, there is a need and desire to provide alternative anodes that can utilize some of the benefits of additive manufacturing but without the problems associated with additive manufacturing of anodes.

SUMMARY OF THE PRESENT INVENTION

A feature of the present invention is to provide methods that utilize spherical powders, such as tantalum powder or other metal powder or metal oxides thereof, without using additive manufacturing or 3D printing processes.

Another feature of the present invention is to provide anodes and capacitors from such methods.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purpose of the present invention, as embodied and broadly described herein, the present invention relates to a capacitor anode. The capacitor anode is formed from or includes a powder that is pressed and sintered, wherein the powder is or includes a spherical metal powder and/or a spherical metal oxide powder. The spherical powder, such as a spherical tantalum powder, includes a spherical shape wherein the powder has an average aspect ratio of from 1.0 to 1.4; a purity of at least 99.9 wt % based on total weight of the powder, excluding gas impurities; an average particle size of from about 0.5 micron to about 250 microns; a true density that is within +−3% of the metal (e.g., for tantalum, having a true or actual density of from 16 g/cc to 16.7 g/cc measured at 20° C.); an apparent density of from about 1.5 g/cc to about 15.5 g/cc; and a Hall flow rate of 40 sec or less. The spherical powder can be, and preferably is a plasma heat-treated powder. The spherical powder is a metal or metal oxide powder or both wherein the metal and/or metal oxide powder is electrically conductive.

Further, the present invention relates to a method to make the capacitor anodes of the present invention. The method can include plasma heat-treating a starting powder that is metal powder or niobium sub-oxide powder, to at least partially melt at least an outer surface of the starting powder in an inert atmosphere to obtain a heat-treated powder, and cooling the heat-treated powder in an inert atmosphere to obtain the spherical powder, and then pressing the powder to form a pressed body; sintering the pressed body one or more times to form a sintered body; and anodizing the sintered body in an electrolyte to form a dielectric oxide film on the sintered body to form said capacitor anode.

The starting powder can be a tantalum powder, which can be a sodium-reduced tantalum powder or other salt-reduced tantalum powder or reduced tantalum powder by other processes and techniques, such as electrolytic, hydrogen reduction, and the like. The starting powder can be a basic lot metal powder. For instance, the starting tantalum powder can be a basic lot tantalum powder.

It is to be understood that both the foregoing general description and the following detailed description are exemplary and explanatory only and are intended to provide further explanation of the present invention, as claimed.

DETAILED DESCRIPTION OF THE PRESENT INVENTION

The present invention relates to novel capacitor anodes and to capacitors containing said capacitor anode(s). The present invention further relates to methods of making the novel capacitor anodes and capacitors containing said capacitor anode(s).

The capacitor anodes contain or include a spherical powder that is a spherical metal powder and/or spherical metal (e.g. niobium) sub-oxide powder that is in the form of pressed and sintered anode body.

As opposed to other spheroidization technologies, plasma spheroidization provides the energy needed to melt the starting material quickly and produces a truly spherical powder with high purity, and/or low oxygen, and/or minimal gas entrapment and/or a controlled particle size distribution (PSD).

In more detail, the spherical powder of the present invention comprises, consists essentially of, consists of, or includes a spherical shape wherein the powder has an average aspect ratio of from 1.0 to 1.4; a purity of at least 99.9 wt % (with purity being a reference to the metal or metal oxide purity, based on total weight of the powder, excluding gas impurities); an average particle size of from about 0.5 micron to about 250 microns; a true density of ±3% of the theoretical density of the metal or metal oxide (e.g., for Ta—a true density of from 16 g/cc to 16.7 g/cc); an apparent density of from about 1.5 g/cc to about 15.5 g/cc; and a Hall flow rate of 40 sec or less.

Except for the properties set forth above for the spherical powder with respect to spherical shape, purity, average particle size, density and Hall flow rate, it is to be understood that there is no other critical limitations with regard to the type of powder, that can be used in the anode manufacturing methods of the present invention as described herein.

With regard to the spherical powder, any spherical capacitor grade powder and/or spherical metal powder and/or spherical metal oxide powder that is capable of being formed into a capacitor anode can be used. Specific examples include, but are not limited to, spherical metal powders or conductive metal oxides thereof.

The spherical metal powder can be a valve metal powder. The spherical metal powder can be tantalum. The spherical metal powder can be niobium. The spherical metal powder can be other metals, such as, but not limited to, conductive metals. The spherical metal powder can be silicon, titanium, chromium, nickel, copper, zinc, zirconium, molybdenum, silver, gold, tungsten, and/or rhenium. The spherical powder of the present invention can be what is considered sodium reduced metal powder, or a reduced metal powder, or it can be vapor phased-reduced metal, or ingot-derived metal powder.

More specific examples include, but are not limited to, tantalum metal powder, niobium metal, and/or niobium suboxide powders. The niobium suboxide powder can be of the formula $NbO_x$, wherein x is 0.7 to 1.2. More specific examples are where x is 0.8 to 1. Examples include NbO, $NbO_{1.1}$, $NbO_{0.8}$, $NbO_{0.9}$, and the like. The niobium suboxides can be considered oxygen reduced niobium oxides. The niobium suboxide powders and, in general, acceptable niobium suboxide powders are those that are conductive. Examples of niobium suboxide powders that can be made spherical include those set forth in U.S. Pat. Nos. 8,040,060; 8,110,172; 7,655,214; 7,515,397; 7,445,762; 7,445,679; 7,241,436; 7,220,397; 6,759,026; 6,639,787; 6,576,099; 6,462,934; 6,416,730; 6,391,275; 6,373,685; and 6,322,912, all incorporated in their entirety by reference herein.

As indicated, the spherical powder of the present invention has a spherical shape. This shape is defined by an average aspect ratio. The average aspect ratio of the powder or aspect ratio is defined herein as the ratio of the largest linear dimension of a particle (i.e., powder) to the smallest linear dimension of the same particle (i.e., powder) based on measuring randomly 50 particles or 100 particles or measuring randomly about 1% by weight to about 2% by weight of the batch of powder. The measuring of the particles is done using Scanning Electron Micrograph (SEM) images. True spherical particles have an aspect ratio of 1.0. For purposes of the present invention, the powder is considered spherical when the average aspect ratio is from 1.0 to 1.4, or from 1.0 to 1.3, or from 1.0 to 1.25, or from 1.0 to 1.2, or from 1.0 to 1.15, or from 1.0 to 1.1 or from 1.0 to 1.05, or from about 1.05 to about 1.25, or from 1.05 to about 1.2, or from 1.05 to about 1.1, or about 1.0.

The spherical powder of the present invention is a high purity powder, meaning the powder has a purity of at least 99.5 wt % (with purity being a reference to the metal or niobium sub-oxide purity, based on total weight of the powder, excluding gas impurities). The purity level can be measured by x-ray fluorescence, Inductively Coupled Plasma Atomic Emission Spectroscopy (ICP-AES) or ICP Atomic Emission Spectroscopy, or Inductively Coupled Plasma Mass Spectrometry (ICP-MS) or ICP Mass Spectrometry or Glow Discharge Mass Spectrometry (GDMS), Spark Source Mass Spec (SSMS) Analysis, or any combinations thereof. The metal or metal oxide (e.g. niobium sub-oxide) purity can be at least 99.9 wt %, at least 99.95 wt %, at least 99.995 wt %, or from about 99.9 wt % to 99.9995 wt %, or from about 99.95 wt % to 99.9995 wt %, or from about 99.99 wt % to 99.9995 wt % or other purity values or ranges. For instance, for Ta, the metal purity can be at least 99.5 wt % Ta, at least 99.95 wt % Ta, at least 99.99 wt % Ta, or from about 99.5 wt % Ta to 99.9995 wt %, or from about 99.95 wt % Ta to 99.9995 wt % Ta, or from about 99.99 wt % Ta to 99.9995 wt % Ta or other purity values or ranges.

The spherical powder has an average particle size of from about 0.5 micron to about 250 microns. The average particle size is determined by measuring randomly 50 particles using laser diffraction, or dynamic light scattering, or dynamic image analysis techniques, such as an HORIBA LA-960 or LA-300 Laser Particle Size Analyzer, or a HORIBA SZ-100 Nanopartica Instrument, or an HORIBA Camsizer or Camsizer X2 dynamic image analysis system. The average particle size can be from about 0.5 micron to about 10 microns, or from about 5 microns to about 25 microns, or from about 15 microns to about 45 microns, or from about 35 microns to about 75 microns, or from about 55 microns to about 150 microns, or from about 105 microns to about 250 microns.

The spherical powder has an apparent density of from about 1.5 g/cc to about 15.5 g/cc. For instance, the apparent density can be from about 4 g/cc to about 12.6 g/cc, such as from about 4.5 g/cc to about 12 g/cc or from about 5 g/cc to about 10 g/cc or from about 6 g/cc to about 12.5 g/cc or other apparent density numbers within these ranges. The apparent density is measured according to ASTM B212 standard.

The spherical powder has a true (or actual) density that is within 3% of the theoretical density of that metal or metal oxide that forms the spherical powder. For instance, the true density of the spherical powder can be from 1.7 g/cc to 21 g/cc such as from 2 g/cc to 20 g/cc or 4.5 g/cc to 20 g/cc, or from 10 g/cc to 20 g/cc, or from 6.5 g/cc to 20 g/cc, or from 9 g/cc to 20 g/cc, or from 16 g/cc to 16.7 g/cc depending on the metal or metal oxide present in the spherical powder. The reference to 'true density' is a measurement of the actual density of the metal powder. Most materials will not have the theoretical density of that metal due to porosity or other reasons. With the metal powder used in the present invention, the metal in the metal powder has an actual density (considered the true density) that is within 3%, or within 2%, or within 1% of the theoretical density for that metal. For instance, tantalum has a theoretical density of 16.6 g/cc, and the tantalum spherical powder used in the present invention can have a true (or actual) density of 16.6 g/c or within 3% of 16.6 g/cc. This also applies to the metal oxides referenced herein.

The spherical powder has a Hall flow rate of 40 seconds or less. The Hall Flow test is conducted according to ASTM B213 standard, where the metal powder is timed as it flows through the orifice of a Hall Flowmeter funnel. The Hall flow rate of the metal powder of the present invention can be 35 seconds or less, 30 seconds or less, 25 seconds or less, 20 seconds or less, 19 seconds or less, 15 seconds or less, 10 seconds or less, or from 4 seconds to 40 seconds, or from 5 seconds to 30 seconds, or from 6 seconds to 25 seconds, or from 4 seconds to 15 seconds, or from 4 seconds to 12 seconds, or from 5 seconds to 15 seconds, or other values in these ranges.

The powder can be, and preferably is plasma heat-treated.

The spherical powder can have various oxygen levels. For instance, the powder can have an oxygen level of 15,000 ppm or less, 12,000 ppm or less, 10,000 ppm or less, 7,500 ppm or less, 5,000 ppm or less, 2,500 ppm or less, or 1,000 ppm or less, such as from about 200 ppm to 15,000 ppm, or from about 600 ppm to about 15,000 ppm, or from 750 ppm to 12,000 ppm.

As an option, the spherical powder of the present invention can be an alloy. For instance, the powder can be a Ta—Ti alloy or a Ta—Si alloy or Ta—W alloy or Ta—Mo alloy or Ta—Nb alloy, or other Ta-metal alloys. The alloy percentages can be Ta: 30 wt % to 99.9 wt % and for the other non-Ta metals in the alloy, the wt % can be from 0.1 wt % to 70 wt %, based on the total weight of the alloy. The Ta-metal alloy can be tantalum with one other metal, two other metals, or three or more other metals present but not as impurities. The tantalum in the Ta-metal alloy can be the predominate metal (e.g., the tantalum is the metal present in the highest percent based on the weight of the alloy). One further example of a Ta-metal alloy is Ta—Nb—Ti.

The spherical powder of the present invention can have one or more other properties selected from the following:
  a D10 size of from about 5 microns to about 25 microns; and/or
  a D90 size of from about 20 microns to about 80 microns.

The spherical powder of the present invention can be a non-aggregated powder, wherein the properties/parameters described herein are for a non-aggregated powder.

The spherical powder of the present invention can be a non-agglomerated powder, wherein the properties/parameters described herein are for a non-agglomerated powder.

As an option, the spherical powder can be phosphorous doped. For instance, the phosphorous doped levels can be at least 50 ppm, or at least 100 ppm, or, for instance, from about 50 ppm to about 500 ppm, and the like. Phosphoric acid or ammonium hexafluorophosphate and the like are suggested as the forms of phosphorus.

As an option, the spherical powder can be doped with other elements, such as yittrium, silica, or one or more other dopants, such as gas and/or metal dopants. The doped levels can be at least 5 ppm, at least 10 ppm, at least 25 ppm, at least 50 ppm, or at least 100 ppm, or, for instance, from about 5 ppm to about 500 ppm, and the like. One or dopants can be used for grain stabilization and/or for other property enhancements of the powder or the resulting anode made from the powder.

As an option, in the present invention, the powder utilized to form the capacitor anode can further include one or more non-spherical metal powder(s) and/or non-spherical metal sub-oxide (e.g. Nb sub-oxide) powders.

The non-spherical powder can be, comprise, consists of, consist essentially of, or include angular powder, flake powder, and/or nodular powder, or any combinations thereof. The non-spherical powder can have one or more of the properties mentioned for the spherical powder excluding the average aspect ratio of from 1.0 to 1.4.

The powder can be, comprise, consists of, consist essentially of, or include from 1% to 99% by weight of the spherical powder and from 1% to 99% by weight of the non-spherical powder, or from 25% to 75% by weight of the spherical powder and from 25% to 75% by weight of the non-spherical powder, or from 50% to 99% by weight of the spherical powder and from 1% to 50% by weight of the non-spherical powder, or from 75% to 99% by weight of the spherical powder and from 1% to 25% by weight of the non-spherical powder.

As an option, the spherical powder used in the capacitor anode can be, comprise, consists of, consist essentially of, or include comprises at least two different size fractions, wherein the size fraction is based on average particle size of the size fraction. For instance, the spherical powder can be, comprise, consists of, consist essentially of, or include a first size fraction having an average particle size from about 10 microns to about 25 microns, and a second size fraction of from about 26 microns to about 45 microns. Other examples of size fractions—first size fraction and second size fraction include a first size fraction of from about 0.5 micron to about 15 microns, and a second size fraction of from about 35 microns to about 75 microns.

The spherical powder of the present invention can be made using a plasma heat-treating process. For instance, a process to make the powder of the present invention can comprise, consists essentially of, consists of, or include step a: plasma heat-treating a starting powder, (e.g. metal powder such as valve metal powder and/or valve metal sub-oxide powder) to at least partially melt at least an outer surface of the starting powder in an inert atmosphere to obtain a heat-treated powder, and then step b: cooling the heat-treated powder in an inert atmosphere to obtain the spherical powder. The starting powder can be fully melted or at least 90% by weight melted by the plasma treatment (e.g., in the plasma torch region of the plasma reactor).

In the process, the starting powder can be a sodium-reduced valve metal powder or other reduced valve metal powder, or be any other source of valve metal powder or valve metal sub-oxide powder as mentioned herein. In the process, the starting powder can be a basic lot metal powder or basic lot metal sub-oxide powder.

For instance, when the metal is tantalum, the starting tantalum powder can be obtained by a melt reduction of potassium fluorotantalate ($K_2TaF_7$) or the starting tantalum powder can be obtained by a sodium reduction of tantalum in the vapor phase (also referred to as "vapor phase-reduced secondary particles of tantalum"). Thus, the starting tantalum powder can be produced by tantalum salt reduction.

Melt-reduced particles of tantalum can be obtained in a process involving reducing potassium fluorotantalate ($K_2TaF_7$) with sodium (or other reducing agents) in molten salt to produce tantalum particles that can be agglomerates of primary particles and then optionally water-washing, acid-washing, and drying these particles.

Vapor phase-reduced particles of tantalum can be obtained by contacting and reacting vaporized tantalum chloride with vaporized sodium. These vapor phase-reduced particles of tantalum can be composed of multiple primary particles of tantalum formed by the reaction between tantalum chloride and sodium that are encased in the sodium chloride produced by this reaction.

The starting powder used in the process to make the spherical powder can be what is considered basic lot powder, such as basic lot valve metal. The starting powder that can be used can be what is considered secondary particles of plasma-treated metal powders.

In the process, the starting powder can be ingot-derived metal. In the process, the starting powder can be powder metallurgy (powder-met) derived metal powder.

As an option, the starting powder can be non-hydrided or can be hydrided before being introduced into the plasma treatment.

In the process to make the spherical powder, prior to step a, the starting powder can be formed by sintering a first powder to obtain a sintered powder (which can be in the form of a sintered mass such as a green log or other shape), and then e-beam melting of the sintered powder or mass to obtain an ingot, and then reducing the ingot to the starting powder. The sintering can occur at conventional sintering temperatures for metal powder or metal sub-oxide powder. For instance, and only as an example, the powder can be sintered at a temperature of from about 700 deg C. to about 1,450 deg C. (or from about 800 deg C. to about 1,400 deg C., or from about 900 deg C. to about 1,300 deg C.). The sintering time can be from 1 minute to several hours, such as from about 10 minutes to 4 hours or from 10 minutes to 3 hours, or from about 15 minutes to about 2 hours or from about 20 minutes to about 1 hour or other time periods. As an option, one or more heat treatments or sinterings can occur, whether at the same temperature, same times, or at different temperatures and/or different heat treatment times. The sintering can occur in an inert atmosphere such as an argon atmosphere. The sintering can occur in a conventional furnace used for sintering of metal powders.

In the option to form an ingot that is then reduced to a powder, the ingot can have or be any volume or diameter or shape. The electron beam processing can occur at a melt rate of from about 300 lbs. to about 800 lbs. per hour using 20,000 volts to 28,000 volts and 15 amps to 40 amps, and under a vacuum of from about $1\times10^{-3}$ Torr to about $1\times10^{-6}$ Torr. More preferably, the melt rate is from about 400 lbs. to about 600 lbs. per hour using from 24,000 volts to 26,000 volts and 17 amps to 36 amps, and under a vacuum of from about $1\times10^{-4}$ Torr to $1\times10^{-5}$ Torr. With respect to the VAR processing, the melt rate is preferably of 500 lbs. to 2,000 lbs. per hour using 25 volts to 45 volts and 12,000 amps to 22,000 amps under a vacuum of $2\times10^{-2}$ Torr to $1\times10^{-4}$ Torr, and more preferably 800 lbs. to 1200 lbs. per hour at from 30 volts to 60 volts and 16,000 amps to 18,000 amps, and under a vacuum of from $2\times10^{-2}$ Torr to $1\times10^{-4}$ Torr.

The ingot can have a diameter of at least 4 inches or at least 8 inches, or have a diameter of at least 9½ inches, at least 11 inches, at least 12 inches, or higher. For instance, the ingot can have a diameter of from about 10 inches to about 20 inches or from about 9½ inches to 13 inches, or from 10 inches to 15 inches, or from 9½ inches to 15 inches, or from 11 inches to 15 inches. The height or length of the ingot can be any amount, such as at least 5 inches or at least 10 inches or at least 20 inches, at least 30 inches, at least 40 inches, at least 45 inches, and the like. For instance, the length or height of the ingot can be from about 20 inches to about 120 inches or from about 30 inches to about 45 inches. The ingot can be cylindrical in shape, though other shapes can be used. After the formation of the ingot, optionally, the ingot can be machine cleaned using conventional techniques. For instance, the machine cleaning (off the surface) can result in a reduction in the diameter of the ingot, such as diameter reduction of from about 1% to about 10%. As a specific example, the ingot can have a nominal as-cast diameter of 12 inches and, due to machine cleaning, can have a diameter after machine cleaning of 10.75 to 11.75 inches in diameter.

The ingot can be reduced to a starting powder by making the ingot brittle and then crushing the ingot or subjecting the ingot to particle reduction steps such as milling, jaw crushing, roll crushing, cross beating and the like. To make the ingot brittle, the ingot can be hydrided such as by placing the ingot in a furnace with a hydrogen atmosphere.

With regard to the plasma heat-treating, this can also be known as plasma treatment or plasma processing. In the present invention, a RF plasma treatment or induction plasma treatment can be used. For instance, an RF thermal plasma system or an induction plasma reactor can be used, such as one from Tekna, Sherbrooke, QC, Canada, such as a PL-35LS or PL-50 or TEK-15 or other models. The central gas for the plasma can be argon, or a mixture of argon with other gases, or other gases such as helium and the like. The feed rate of the central gas can be a suitable flow such as from about 10 L/min to about 100 L/min or from about 15 L/min to about 60 L/min or other flow rates. The sheath gas for the plasma can be argon, or a mixture of argon with other gases, or other gases such as other inert gases or helium and the like. The feed rate of the sheath gas can be a suitable flow such as from about 10 L/min to about 120 L/min or from about 10 L/min to about 100 L/min or other flow rates. The carrier gas for the starting powder can be argon, or a mixture of argon with other gases (e.g., hydrogen can be added to increase the plasma intensity), or other gases such as other inert gases or helium and the like. The feed rate of the carrier gas can be a suitable flow such as from about 1 L/min to about 15 L/min or from about 2 L/min to about 10 L/min or other flow rates. The feeding rate of the starting powder into the plasma torch area can be any flow rate, such as from about 1 g/min of powder to about 120 g/min or from about 5 g/min to about 80 g/min of starting powder. Generally, a lower feed rate of the starting powder ensures more uniform and more complete spheroidal processing of the starting powder. After exiting the plasma torch area, a quench gas can be optionally used, such as through one or more quenching ports. The quench gas can be any suitable non-reactive gas, such a helium or argon. If used, the quenching gas can be fed at a variety of flow rates. For instance, the flow rate of the quench gas can be from about 25 L/min to 300 L/min or from about 50 L/min to about 200 L/min or other amounts. As an option, instead of or in addition to using a quench gas, gravity and/or a water-cooled cooling jacket can be used. The designs described in U.S. Pat. No. 5,200,595 and WO 92/19086 can be used. As an option, a passivation gas can be used after the powder is quenched or after the powder begins to cool down. The passivation gas can be oxygen, air, or a combination of air and oxygen. The flow rate of the passivation gas can be any flow rate, such as a flow rate of from about 0.1 L/min to about 1 L/min or other amounts. The chamber pressure of the plasma torch can be any suitable pressure, such as from about 0.05 MPa to about 0.15 MPa. The plate voltage can be from about 5 kV to about 7.5 kV. The frequency of the RF plasma system can be 3 MHz or other values. The plate current can be from about 2.5 A to about 4.5 A. The power can be from about 15 kW to about 35 kW. The distance from the plasma torch to the feeding nozzle or the probe position can be adjusted or varied. The distance can be 0 cm, or about 0 cm or from about 0 cm to about 8 cm. The greater the distance, the less surface evaporation of the starting powder. Thus, if the starting powder is very irregular and has aspect ratios of over 2 or over 3, an option is to have the distance of the feeding nozzle close to 0 cm. If the starting powder is more regular in shape, such as having aspect ratios of from about 1.3 to 2, the distance of the feeding nozzle can be further away from the plasma torch as an option. Also, a higher plasma powder setting can also be used to handle more irregular shaped starting powders.

As an option, the powder that has been plasma treated can be collected, such as collected under a protective atmosphere, such as an inert gas like argon. The collected powder can be passivated, such as using a water bath. The collected powder can be introduced into a water bath (e.g., submerged in a water bath).

As an option, the collected powder can be subjected to a sonication or other powder vibratory method to remove small particles such as nano materials deposited on the surface of the spheres (e.g., removing satellites and other loose material on the spheres). The resulting recovered spheres can optionally be dried, for instance, under a protective gas, such as an inert gas, like argon. This drying can be at any temperature, for instance, at a temperature of 50 deg C. to 100 deg C. for 10 mins to 24 hours, or 1 hour to 5 hours and the like. The recovered powder can be put in sealed bags such as aluminum lined anti-static bags for further use.

With the plasma treatment used in the present invention, the effort put into creating the particle size distribution of the starting powder and/or other morphology can carry through to the finished powder exiting the plasma process. Put another way, the size of the particle can be substantially maintained except for removing sharp edges and/or removing surface roughness and/or making the starting powder spherical or more spherical. Thus, prior to introducing the starting powder into the plasma treatment, the starting powder can be subjected to one or more steps to achieve desirable particle size distributions and/or other particle characteristics. For instance, the particle size distribution of the starting powder can be such that the D10 and/or D90 are within 50%, or within 40%, or within 30%, or within 25%, or within 20%, or within 15%, or within 10% or within 5% of the D50 of that starting powder.

The starting powder prior to being introduced into the plasma treatment can be subjected to one or more sieving steps or other particle screening steps, for instance to obtain a particle size distribution as described above or other sieve cuts, such as, but not limited to, a minus 200 mesh cut, a minus 225 mesh cut, a minus 250 mesh cut, a minus 275 mesh cut, a minus 300 mesh cut, and so on (with mesh being US Mesh sizes).

The starting powder, prior to plasma treating, can have one of the following particle size ranges: the average particle size can be from about 0.5 micron to about 10 microns, or from about 5 microns to about 25 microns, or from about 15 microns to about 45 microns, or from about 35 microns to about 75 microns, or from about 55 microns to about 150 microns, or from about 105 microns to about 250 microns.

In the process to make the spherical powder, the starting powder can have a first particle size distribution, and the resulting (or finished) spherical powder (e.g., after plasma treatment) can have a second particle size distribution, and the first particle size distribution and the second particle size distribution are within 15% of each other, within 10% of each other, or within 5% of each other, or within 2.5% of each other or within 1% of each other.

The starting powder prior to being introduced into the plasma treatment can be subjected to deoxidation treatments to remove oxygen from the powder.

The starting powder prior to plasma treating can be classified or sieved to remove various sizes, for instance, removing particles less than 20 microns, less than 15 microns, less than 10 microns, or less than 5 microns.

After exiting the plasma treatment, the plasma-treated powder can be subjected to one or more post-processing steps.

For instance, one post-processing step can be passing the plasma-treated powder through one or more sieves to remove certain sized plasma-treated powder.

For instance, one post-processing step can be sonicating or using other vibratory techniques to remove imperfections from the spheres. For instance, the spheres from the plasma treatment can be put in a water bath and sonicated to remove nano materials on the spheres and then the spheres can be recovered.

For instance, one post-processing step can be optionally subjecting the plasma-treated powder to at least one deoxidation or 'deox' step. The deoxidation can involve subjecting the plasma-treated powder to a temperature of from about 500° C. to about 1,000° C. in the presence of at least one oxygen getter. For instance, the oxygen getter can be a magnesium metal or compound. The magnesium metal can be in the form of plates, pellets, or powder. Other oxygen getter material can be used.

For instance, one post-processing step can be optionally subjecting the plasma-treated powder to one or more heat treatment steps or annealing steps. With regard to the heat treating step of the plasma-treated powder, the heat treating can occur in a conventional oven under vacuum or under inert temperature. The heat treatment temperature is generally at least 800° C., or at least 1,000° C., or from about 800° C. to about 1,450° C., or from about 1,000° C. to about 1,450° C., and the like. While any heat treatment time can be used, examples include, but are not limited to, at least 10 minutes, at least 30 minutes, from about 10 minutes to about 2 hours, or more. As an option, one or more heat treatments can occur, whether at the same temperature, same times, or at different temperatures and/or different heat treatment times. After heat-treatment, if used, the plasma-treated powder can maintain the Hall flow rate achieved prior to the heat-treatment or be within 20% or within 10% or within 5% of that Hall flow rate.

For instance, one post-processing step can be subjecting the plasma-treated powder to acid leaching, such as using conventional techniques or other suitable methods. The various processes described in U.S. Pat. Nos. 6,312,642 and 5,993,513, for example, can be used herein and are incorporated in their entireties by references herein. The acid leaching can be performed using an aqueous acid solution comprising a strong mineral acid as the predominant acid, for example, nitric acid, sulfuric acid, hydrochloric acid, and the like. Also, a hydrofluoric acid (e.g., HF) in minor amounts (e.g., less than 10% by weight, or less than 5% by weight, or less than 1% by weight based on the total weight of acid) can be used. The mineral acid concentration (e.g., $HNO_3$ concentration) can range from about 20% by weight to about 75% by weight in the acid solution. The acid leach can be conducted at elevated temperatures (above room temperature to about 100° C.) or at room temperature, using acid compositions and techniques as shown, for example, in U.S. Pat. No. 6,312,642 B1. The acid leach step typically is performed under normal atmospheric conditions (e.g., approximately 760 mm Hg). The acid leach step performed using conventional acid compositions and pressure conditions, such as indicated, can remove soluble metal oxides from the deoxidized powder for those conditions.

As an option, the plasma-treated powder can be nitrogen doped. With respect to nitrogen, the nitrogen can be in any state, such as a gas, liquid, or solid. The powders of the present invention, can have any amount of nitrogen present as a dopant or otherwise present. Nitrogen can be present as a crystalline form and/or solid solution form at any ratio. Nitrogen doped levels can be from 5 ppm to 5,000 ppm nitrogen or higher.

As indicated, spherical powder, such as a plasma-treated powder (e.g., plasma-treated tantalum powder) can be further processed to form a capacitor electrode (e.g., capacitor anode). This can be done, for example, by compressing the plasma treated powder to form a body, sintering the body to form a porous body, and anodizing the porous body.

The pressing of the powder can be achieved by any conventional techniques such as placing the powder in a mold and subjecting the powder to a compression by use of a press, for instance, to form a pressed body or green body. Various press densities can be used, and include, but are not limited to, from about 1.0 g/cm³ to about 7.5 g/cm³.

The powder can be sintered, anodized, and/or impregnated with an electrolyte in any conventional manner. For instance, the sintering, anodizing, and impregnation techniques described in U.S. Pat. Nos. 6,870,727; 6,849,292; 6,813,140; 6,699,767; 6,643,121; 4,945,452; 6,896,782; 6,804,109; 5,837,121; 5,935,408; 6,072,694; 6,136,176; 6,162,345; and 6,191,013 can be used herein and these patents are incorporated in their entirety by reference herein.

The sintered anode pellet can be, for example, deoxidized in a process similar to that described above for the powder. The anodized porous body further can be impregnated with manganese nitrate solution, and calcined to form a manganese oxide film thereon. Wet capacitors can use a liquid electrolyte as a cathode in conjunction with their casing. The application of the cathode plate can be provided by pyrolysis of manganese nitrate into manganese dioxide. The pellet can be, for example, dipped into an aqueous solution of manganese nitrate, and then baked in an oven at approximately 250° C. or other suitable temperatures to produce the manganese dioxide coat. This process can be repeated several times through varying specific gravities of nitrate to build up a thick coat over all internal and external surfaces of the pellet. The pellet optionally can be then dipped into graphite and silver to provide an enhanced connection to the manganese dioxide cathode plate. Electrical contact can be established, for example, by deposition of carbon onto the surface of the cathode. The carbon can then be coated with a conductive material to facilitate connection to an external cathode termination. From this point the packaging of the capacitor can be carried out in a conventional manner, and can include, for example, chip manufacture, resin encapsulation, molding, leads, and so forth.

As part of forming an anode, for example, a binder, such as camphor ($C_{10}H_{16}O$) and the like, can be added to the powder, for instance, in the amount of 3-5 wt % based on 100 wt % of the powder and the mixture can be charged into a form, compression-molded, and sintered by heating for 0.3-1 hour at 1,000-1,400° C. while still in a compressed state. Such a molding method makes it possible to obtain pellets consisting of sintered porous bodies.

When a pellet obtained using the above-described molding process is employed as a capacitor anode, before the powder is compression-molded, it is preferable to embed lead wires into the powder in order to integrate the lead wires into the pellet.

The capacitor can be manufactured using the above-described pellet. A capacitor anode can be formed with the powders of the present invention by any method, for example, as described in U.S. Pat. Nos. 8,657,915, 6,527, 937 B2; 6,462,934 B2; 6,420,043 B1; 6,375,704 B1; 6,338, 816 B1; 6,322,912 B1; 6,616,623; 6,051,044; 5,580,367; 5,448,447; 5,412,533; 5,306,462; 5,245,514; 5,217,526; 5,211,741; 4,805,704; and 4,940,490, all of which are incorporated herein in their entireties by reference.

A capacitor equipped with an anode can be obtained by oxidizing the surface of the pellet, a cathode facing the anode, and a solid electrolyte layer disposed between the anode and cathode.

A cathode terminal is connected to the cathode by soldering and the like. In addition, an exterior resin shell is formed around a member composed of the anode, cathode, and solid electrolyte layer. Examples of materials used to form the cathode include graphite, silver, and the like. Examples of materials used to form the solid electrolyte layer include manganese dioxide, lead oxide, electrically conductive polymers, and the like.

When oxidizing the surface of a pellet, for example, a method can be used that involves treating the pellet for 1-3 hours in an electrolyte solution such as nitric acid, phosphoric acid and the like with a concentration of 0.1 wt % at a temperature of 30-90° C. by increasing the voltage to 20-60V at a current density of 40-120 mA/g. A dielectric oxide film is formed in the portion oxidized at such time.

The anode for the solid electrolytic capacitor of the present invention is a porous sintered body that can be obtained by sintering the above mentioned spherical powder alone or with other non-spherical powder.

The temperature for sintering the powder can be from about 1,000° C. to about 1,700° C., preferably 1,000° C.-1,400° C. Sintering time can be about 0.1 hour to about 2 hours or more, preferably 0.25 hour to 1 hour. In addition, when sintering, a lead wire may be embedded in the powder.

The finished powder can be compressed to form a pellet, sintered to form a porous body, and anodized in a suitable electrolyte to form a continuous dielectric oxide film on the sintered body. The finished powder can be formed into a pellet with or without temporary binder that is eliminated during sintering. Temporary binder, if used, can be used in an amount of about 1 wt % to 10 wt % or other amounts, can be added to the powder prepared above and sufficiently mixed therewith. Subsequently, a 0.4 mm to 4 mm or other sized diameter pellet can be prepared by a press molding, which can use any typical press molding equipment and techniques used for this purpose. The powder can be formed into pellets using a press density of from 1 g/cm$^3$ to 10 g/cm$^3$ or other values. Preferred examples of the temporary binder, if used, include camphor, stearic acid, polyvinyl alcohol, naphthalene, singly or in combinations or other binder materials. As indicated, metal lead wires, such as tantalum wire, can be embedded in the powder and any binder before sintering. The pellet can be sintered by heating in a vacuum of a furnace pressure, such as of 0.001 Pa or lower, at the indicated sintering temperatures and times. In such manner, a porous tantalum sintered body can be prepared. The sintered pellet has holes (or passageways or pores) sufficiently sized for a conductive polymer-containing solution to pass through.

The sintered body, e.g., sintered pellet, may be deoxidized with magnesium and acid leached in a process similar to the powder treatment prior to being anodized. The resulting sintered body typically is subjected to anodic oxidation to form an oxide film on the surface of the sintered body, thereby preparing an anode. In the anodic oxidation, for example, a 0.05 vol % to 2 vol % solution of phosphoric acid can be used at a temperature of 55-65° C., or other temperatures, and the voltage can be 5 V to 15 V at a current density of 75 μA/g to 125 μA/g, and the anodic oxidation can be performed under this condition for 1 hour to 3 hours, or other values.

The anode porosity (sintered anode) can be characterized by pore size distribution that is unimodal or multi-modal, and preferably can be unimodal with more than 90%, or more than 95%, or more than 99%, or 100% (by volume) of pores having pore size of less than 150 nm, or from 1 nm to 1000 nm (e.g., from 1 nm to 149 nm, or from 1 nm to 1000 nm, or from 10 nm to 1000 nm, or from 50 nm to 1000 nm, or from 100 nm to 1000 nm) and a peak pore size in the range of from 40 nm to 150 nm, or from 50 nm to 90 nm, or from 60 nm to 70 nm, or other values. The anodes can have low embrittlement, such as determined from passing standard manual wire bending tests (e.g., 10 bending times).

Anodes made with or including the spherical powders described herein can have a capacitance (CV) of at least 1,000 μF-V/g, at least 5,000 μF-V/g, at least 10,000 μF-V/g, at least 30,000 μF-V/g, at least 50,000 μF-V/g, or least 70,000 μF-V/g, or at least 80,000 μF-V/g, or at least 90,000 μF-V/g, or at least 100,000 μF-V/g, or at least 120,000, or at least 150,000 μF-V/g, or at least 175,000 μF-V/g, or at least 200,000 μF-V/g, or at least 225,000 μF-V/g, or at least 250,000 μF-V/g, or from 1,000 to 800,000 μF-V/g, or from 10,000 to 800,000 μF-V/g, or from 30,000 to 800,000 μF-V/g, of from 50,000 μF-V/g to 700,000 μF-V/g, or from 70,000 μF-V/g to 600,000 μF-V/g, or from 80,000 μF-V/g to 500,000 μF-V/g, or from 100,000 μF-V/g to 500,000 μF-V/g, or from 150,000 to 800,000 μF-V/g, or from 150,000 to 500,000 μF-V/g, or 150,000 to 485,000 μF-V/g, or from 150,000 to 470,000 μF-V/g, or from 150,000 to 450,000 μF-V/g, or from 200,000 to 800,000 μF-V/g, or from 200,000 to 500,000 μF-V/g, or 200,000 to 450,000 μF-V/g or other capacitance values.

The anodes of the present invention can have a leakage current of 650 μA/g or less, or 600 μA/g or less, or 550 μA/g or less, or 500 μA/g or less, or from 0 to 650 μA/g, or from 10 to 600 μA/g, or from 50 to 500 μA/g, or other values.

The anodes can have a leakage current (LC/CV) that is less than 10 nA/μFV, or 6 nA/μFV or less, or less than 5 nA/μFV, or less than 4 nA/μFV, or less than 3 nA/μFV, or less than 2 nA/μFV, or less than 1 nA/μFV, or from or from 0.1 to 10 nA/μFV, or from 0.1 to 7.5 nA/μFV, or from 0.1 to 6.0 nA/μFV, or from 0.5 to 6.0 nA/μFV, or from 0.5 to 5.0 nA/μFV, or from 0.1 to 5.0 nA/μFV, or from 0.5 to 4.0 nA/μFV, or from 0.5 to 2.5 nA/μFV, or other values. These capacitance and leakage values can also apply to sintered pellets of the present invention.

Regarding the measuring method of CV and leakage current values in the present invention, tantalum is used as an example, but the same methodology can apply to other metals and metal sub-oxides and the patents mentioned herein provide methods that can be adopted here. First, tantalum pellets are produced. The pellets have tantalum lead wires present. The tantalum powder is formed into pellets using a press density of 4.5 g/cm$^3$ to 5.5 g/cm$^3$. In order to obtain this density, only the mass and pellet shape of the tantalum powder need to be defined. It is preferable to select the sintering temperature of the pellets arbitrarily such that the shrinkage ratio of the tantalum powder remains in a range of 5 to 10%. The sintering temperature is preferably in a range of from 1,100° C. to 1,250° C. Next, chemically converted substances are produced by chemically converting the pellets in a phosphoric acid aqueous solution of concentration 0.1 vol. % at a voltage of 6 V to 10 V. For the chemical conversion, in order to form a uniform (or substantially uniform) oxide film on the surface of tantalum powder, it is preferable to make an adjustment within a range when necessary, and formation conditions are the following: 30° C. to 60° C. for temperature, 4 V to 20 V for voltage, and 90 minutes to 120 minutes for the treatment time. The CV values of the chemically converted substances are measured in a 30.5 (vol.) % sulfuric acid aqueous solution under the conditions: temperature 25° C., frequency 120 Hz, and voltage 1.5 V. Direct leakage current (DLC) is measured as the current value after 3 minutes under conditions of a voltage of 7 V in a 10 vol. % aqueous phosphoric acid solution at 25° C. Also, any individual value within the ranges for capacitance and leakage current can be used for purposes of the present invention.

A solid electrolyte capacitor comprising the anode can be manufactured. A counterelectrode (cathode) forming material can be applied, such as in the form of a conductive polymer, on the tantalum anode. For electrical access to the cathode, a graphite layer and a conductive metal layer, such as a silver layer, contacting the cathode may be applied. The resulting structure can be embedded in a non-conductive material, such as a non-conductive resin (e.g., polypyrrole or polythiophene), to provide the capacitor. Outer terminals can be connected to the anode and the conductive metal layer contacting the cathode material, such as in any suitable method. The entire structure can be covered with a resin to obtain a solid electrolyte capacitor.

The capacitor anode of the present invention can be a wet anode or solid anode. The capacitor anode and capacitor (wet electrolytic capacitor, solid state capacitor, etc.) can be formed by any method and/or have one or more of the components/designs, for example, as described in U.S. Pat. Nos. 6,870,727; 6,813,140; 6,699,757; 7,190,571; 7,172,985; 6,804,109; 6,788,523; 6,527,937 B2; 6,462,934 B2; 6,420,043 B1; 6,375,704 B1; 6,338,816 B1; 6,322,912 B1; U.S. Pat. Nos. 6,616,623; 6,051,044; 5,580,367; 5,448,447; 5,412,533; 5,306,462; 5,245,514; 5,217,526; 5,211,741; 4,805,704; and 4,940,490, all of which are incorporated herein in their entireties by reference.

As indicated, in general, the spherical powder can be formed into a green body and sintered to form a sintered compact body, and the sintered compact body can be anodized using conventional techniques. It is believed that capacitor anodes made from the powder produced according to the present invention have improved electrical leakage characteristics. The capacitors of the present invention can be used in a variety of end uses such as automotive electronics; cellular phones; smart phones; computers, such as monitors, mother boards, and the like; consumer electronics including TVs and CRTs; printers/copiers; power supplies; modems; computer notebooks; and disk drives.

Further details of the starting powder, the plasma-treated powder, and components formed from the powder are provided below and further form optional aspects of the present invention.

With the present invention, the spherical powder (e.g., spherical tantalum powder) and/or any optional additional non-spherical powder (e.g, non-spherical tantalum powder) can have one or more or all of the following properties:
  a) an apparent density of from about 1.5 g/cc to 15.5 g/cc or from 4 g/cc to about 12.3 g/cc,
  b) a D10 particle size of from about 5 microns to about 25 microns,
  c) a D50 particle size of from about 20 microns to about 50 microns,
  d) a D90 particle size of from about 30 microns to about 100 microns, and/or
  e) a BET surface area of from about 0.05 $m^2/g$ to about 20 $m^2/g$.

With the present invention, the spherical powder (e.g., spherical tantalum powder) and/or any optional additional non-spherical powder (e.g, non-spherical tantalum powder) can have one or more or all of the following properties:
  a) an apparent density of from about 9 g/cc to about 12.3 g/cc,
  b) a D10 particle size of from about 12 microns to about 25 microns,
  c) a D50 particle size of from about 20 microns to about 40 microns,
  d) a D90 particle size of from about 30 microns to about 70 microns, and/or
  e) a BET surface area of from about 0.1 $m^2/g$ to about 15 $m^2/g$.

For purposes of the present invention, at least one of these properties, at least two, at least three, at least four, or all five properties can be present.

In at least one embodiment of the present invention, the plasma-treated powder (or starting powder) can have one of more of the following characteristics, but it is to be understood that the powder can have characteristics outside of these ranges:

Purity Levels:
  Oxygen content of from about 50 ppm to about 60,000 ppm, such as from about 100 ppm to about 60,000 ppm or from about 250 ppm to about 50,000 ppm or from about 500 ppm to about 30,000 ppm, or from about 1000 ppm to about 20,000 ppm oxygen. An oxygen (in ppm) to BET (in $m^2/g$) ratio can be from about 2,000 to about 4,000, such as from about 2,200 to about 3,800, from about 2,400 to about 3,600, from about 2,600 to about 3,400, or from about 2,800 to about 3,200, and the like.
  A carbon content of from about 1 ppm to about 100 ppm and more preferably, from about 10 ppm to about 50 ppm or from about 20 ppm to about 30 ppm carbon.
  A nitrogen content of from about 100 ppm to about 20,000 ppm or higher and more preferably from about 1,000 ppm to about 5,000 ppm or from about 3,000 ppm to about 4,000 ppm or from about 3,000 ppm to about 3,500 ppm nitrogen.
  A hydrogen content of from about 10 ppm to about 1,000 ppm, and more preferably from about 300 ppm to about 750 ppm, or from about 400 ppm to about 600 ppm hydrogen.
  An iron content of from about 1 ppm to about 50 ppm, and more preferably from about 5 ppm to about 20 ppm iron.
  A nickel content of from about 1 ppm to about 150 ppm, and more preferably from about 5 ppm to about 100 ppm or from about 25 ppm to about 75 ppm nickel.
  A chromium content of from about 1 ppm to about 100 ppm and more preferably from about 5 ppm to about 50 ppm or from about 5 ppm to about 20 ppm chromium.
  A sodium content of from about 0.1 ppm to about 50 ppm and more preferably from about 0.5 ppm to about 5 ppm sodium.
  A potassium content of from about 0.1 ppm to about 100 ppm and more preferably from about 5 ppm to about 50 ppm, or from about 30 ppm to about 50 ppm potassium.
  A magnesium content of from about 1 ppm to about 50 ppm and more preferably from about 5 ppm to about 25 ppm magnesium.
  A phosphorus (P) content of from about 5 ppm to about 500 ppm and more preferably from about 100 ppm to about 300 ppm phosphorus.
  A fluoride (F) content of from about 1 ppm to about 500 ppm and more preferably from about 25 ppm to about 300 ppm, or from about 50 ppm to about 300 ppm, or from about 100 ppm to about 300 ppm.

The plasma treated powder (or starting powder) (primary, secondary, or tertiary) can have a particle size distribution (based on overall %) as follows, based on mesh size:
  +60 # of from about 0.0 to about 1% and preferably from about 0.0 to about 0.5% and more preferably 0.0 or about 0.0.
  60/170 of from about 45% to about 70% and preferably from about 55% to about 65%, or from about 60% to about 65%.
  170/325 of from about 20% to about 50% and preferably from about 25% to about 40% or from about 30% to about 35%.
  325/400 of from about 1.0% to about 10% and preferably from about 2.5% to about 7.5% such as from about 4 to about 6%.

−400 of from about 0.1 to about 2.0% and preferably from about 0.5% to about 1.5%.

The spherical powder (e.g., Ta), when formed in to an anode with a sintering temperature of 1150° C. for 10 minutes with a formation temperature of 60° C. and a press density of 4.5 g/cc and a formation voltage of 6 V has a capacitance of from about 1,000 CV/g to about 800,000 CV/g, such as from about 30,000 CV/g to about 500,000 CV/g, or from about 70,000 CV/g to about 400,000 CV/g. Also, the leakage current can be less than 20 nA/µFV and can be from about 2.5 to about 15 nA/µFV or from about 3.0 to about 10 nA/µFV. The values or ranges for capacitance and/or leakage current are also possible with a sintering temperature of 1200° C. or 1250° C. for 10 minutes and/or a formation voltage of from 5 volts to 16 volts. Also, any individual value within the ranges for capacitance and leakage current can be used for purposes of the present invention.

The plasma-treated powder of the present invention can also have a pore size distribution which can be unimodal or multi-modal, such as bi-modal.

The plasma-treated powders of the present invention can have a BET surface area of from about 0.01 m$^2$/g to about 20 m$^2$/g, and more preferably from about 0.05 m$^2$/g to about 5 m$^2$/g such as from about 0.1 m$^2$/g to about 0.5 m$^2$/g.

As discussed earlier, the starting powder can be obtained from a variety of processes used to obtain the powder. As stated, the starting powder to be plasma-treated can be raw powder. Raw metal powder or metal sub-oxide powder (e.g., basic lot powder) can be obtained or produced by processes which are capable of providing powders having a surface area of at least 0.1 m$^2$/g or at least 0.5 m$^2$/g. Any capacitor grade powders can be used in this regard. Specific examples of the raw tantalum production process include sodium/halide flame encapsulation (SFE), a sodium reduction process of potassium fluorotantalate, a magnesium reduction process of a tantalum oxide, a gas-phase hydrogen reduction process of tantalum pentachloride, and a pulverizing process of tantalum metal. In the SFE process, vapor-phase sodium reacts with a gaseous metal halide, such as gaseous tantalum halide, to produce an aerosol core material and salt. Techniques employed for the SFE process which can be adapted for preparation of raw metal such as valve metal powders (e.g., raw tantalum powder) for the present invention are described in U.S. Pat. Nos. 5,498,446 and 7,442,227, which are incorporated in their entireties by reference herein. See, also, Barr, J. L. et al., "Processing salt-encapsulated tantalum nanoparticles for high purity, ultra high surface area applications," J. Nanoparticle Res. (2006), 8:11-22. An example of the chemistry employed for the production of metal powder by the SFE process of the '446 patent is as follows, wherein "M" refers to a metal such as Ta: MCl$_x$+XNa+Inert→M+XNaCl+Inert. Tantalum pentachloride is an example of a tantalum halide that can be used as the reactant MCl$_x$, and argon gas may be used as the Inert and carrying gas, in this chemistry. Initially, core particles (e.g., Ta) are produced at the flame and grow by coagulation while the salt remains in the vapor phase. The salt condenses onto the core particles with heat loss, and uncoated core particles are scavenged by the salt particles as salt-encapsulated particles grow. The salt encapsulate allows for size and morphology control and can protect the core particles, such as from oxidation and/or hydrolysis, during storage and handling before use in plasma-treated tantalum powder production. This process can be applied to other metals, such as other valve metal metals besides tantalum. The encapsulate can be removed in known manners, such as vacuum sublimation and/or a water wash, before use of the tantalum powders in plasma-treated tantalum powder production.

Using tantalum only as an example, the starting tantalum powder alternatively can be obtained by the sodium reduction of tantalum salt, such as sodium tantalate fluoride in diluent salt, or other chemical or ingot processing methods.

The raw or starting powder may comprise primary particles that have an average size in the range of 1 nm to about 500 nm, or 10 nm to 300 nm, or 15 nm to 175 nm, or 20 nm to 150 nm, or 25 nm to 100 nm, or 30 nm to 90 nm, or other sizes. The average size and distribution of the primary particles sizes can depend on the method of preparation. The primary particles may tend to form clusters or agglomerates of larger size than the primary particles. The shapes of raw or starting powder particles may include, but are not limited to, flaked, angular, nodular, or spherical, and any combinations thereof or variations thereof. The raw powder used to practice the present invention can have any purity with respect to the metal or metal sub-oxide with higher purities being preferred. For instance, the tantalum purity (e.g., by wt %) of the raw or starting powder can be 95% Ta or greater, or 99% Ta or greater such as from about 99.5% Ta or greater and more preferably 99.95% Ta or greater and even more preferably 99.99% Ta or greater, or 99.995% Ta or greater or 99.999% Ta or greater. These purity levels equally apply to other metals that can be used, such as Nb and equally to the metal sub-oxides such as niobium suboxides.

At any stage, before or after plasma-treatment, the powder can be passivated using an oxygen-containing gas, such as air, as part of the plasma-treated powder production process of the present invention. Passivation typically is used to form a stabilizing oxide film on the powder during processing and in advance of sintered body formation using the powder. A powder production process of the present invention therefore can include hydrogen doping and passivating operations.

Passivating the powder can be by any suitable method. Passivation can be achieved in any suitable container, for example, in a retort, a furnace, a vacuum chamber, or a vacuum furnace. Passivation can be achieved in any of the equipment used in processing, such as heat treating, deoxidizing, nitriding, delubing, granulating, milling, and/or sintering, the powder. The passivating of the powder can be achieved under vacuum. Passivation can include backfilling of the container with an oxygen containing gas to a specified gas pressure, and holding the gas in the container for a specified time. The oxygen content level of the gas used in powder passivation can be from 1 to 100 wt % oxygen, or from 1 to 90 wt %, or from 1 to 75 wt %, or from 1 to 50 wt %, or from 1 to 30 wt %, or from 20 to 30 wt %, or an oxygen content that is the same as or greater than that of air or atmospheric air, or other content levels. The oxygen can be used in combination with an inert gas, such as nitrogen, argon, or combinations of these, or other inert gases. The inert gas does not react with the metal during the passivation process. The inert gas, such as nitrogen gas and/or argon gas, preferably can compose all or essentially all (e.g., >98%) of the remaining portion of the passivating gas other than the oxygen. Air can be used as the passivating gas. Air can refer to atmospheric air or dry air. The composition of dry air typically is nitrogen (about 75.5 wt %), oxygen (about 23.2 wt %), argon (about 1.3 wt %), and the rest in a total amount of less than about 0.05%. The content level of hydrogen in dry air is about 0.00005 vol %.

Additional techniques that may be employed for the passivation process can be adapted from those disclosed in U.S. Pat. No. 7,803,235, which is incorporated in its entirety by reference herein.

Using tantalum only as an example, the salt-containing tantalum can be any salt capable of having tantalum contained therein such as a potassium-fluoride tantalum. With respect to the agent capable of reducing the salt to tantalum and a second salt in the reaction container, the agent which is capable of doing this reduction is any agent which has the ability to result in reducing the salt-containing tantalum to just tantalum metal and other ingredients (e.g. salt(s)) which can be separated from the tantalum metal, for example, by dissolving the salts with water or other aqueous sources. Preferably, this agent is sodium. Other examples include, but are not limited to, lithium, magnesium, calcium, potassium, carbon, carbon monoxide, ionic hydrogen, and the like. Typically, the second salt which also is formed during the reduction of the salt-containing tantalum is sodium fluoride. Details of the reduction process which can be applied to the present invention in view of the present application are set forth in Kirk-Othmer, Encyclopedia of Chemical Technology, $3^{rd}$ Edition, Vol 22, pp. 541-564, U.S. Pat. Nos. 2,950, 185; 3,829,310; 4,149,876; and 3,767,456. Further details of the processing of tantalum can be found in U.S. Pat. Nos. 5,234,491; 5,242,481; and 4,684,399. All of these patents and publications are incorporated in their entirety by reference herein.

The present invention will be further clarified by the following examples, which are intended to be purely exemplary of the present invention.

EXAMPLES

Example 1

Figure 1A:
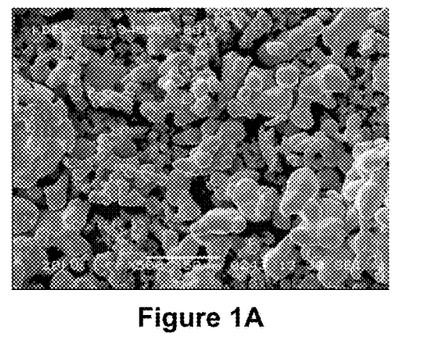
FIG. 1A is a SEM photograph of the starting basic lot tantalum powder used in Example 1 and FIG. 1B is a SEM photograph of the finished tantalum powder of Example 1 after plasma treatment.

Commercially available $KTa_2F_7$ (KTAF) and sodium were used to obtain tantalum powder using a sodium reduction of the KTAF utilizing standard industry processes. The salt byproducts were removed by washing and acid leaching and drying steps. The resulting tantalum powder had a BET of about 0.1 $m^2/g$. This tantalum was a basic lot tantalum powder. FIG. 1A shows a SEM of this starting tantalum powder. The starting tantalum powder was divided into three lots of powder—Lots A, B, and C and each was separately plasma treated as described below.

Next, the basic lot tantalum powder was plasma treated. Particularly, the basic lot tantalum powder was spheroidized by introducing the basic lot tantalum powder into a feeder. The feeder had an argon supply (5 LPM) that aerosolizes the powder into the plasma spheroidization reactor (TEK15, from Tekna, Canada). The feed rate of the powder was maintained at 0.75 kg/hr by adjusting the feeder. The aerosolized powder was introduced into the plasma heat source of the plasma reactor. The plasma reactor had an induction plasma torch using a design described in U.S. Pat. No. 5,200,595 and WO 92/19086 using concentric tubes. The plasma energy used to spheroidize the powder was 15 KW with plate voltage set at 6.5 V, plate current set at 2.3 A and grid current set at 0.4 A. The reactor was inerted using argon gas flow with carrier gas flow set at 5 LPM, sheath gas flow set at 30 LPM, central gas flow set at 10 LPM and nozzle gas flow set at 1 LPM. The plasma intensity was increased by adding hydrogen gas (using flow rates of 4 LPM). The run conditions are summarized in Table 1. The basic lot tantalum powder introduced into the plasma torch was at least partially melted and then spheroidized, and the liquid drops of tantalum were carried downstream from the plasma torch where they cooled rapidly by an active water cooling jacket on the plasma reactor. In this example, the cooled spheroid tantalum powder dropped to the bottom of the plasma reactor via gravity and the spheroid powder was collected under argon gas blanket, and passivated in a water bath. Once under water, the slurry was sonicated (energy <150 W/gal.) to remove potential nanomaterials deposited on surface of spheroid powder. The washed tantalum spheres were then dried under argon at 80° C. for 4 hours. The dried powder was then packaged in Al lined anti-static bags until tested for properties.

Figure 1B:
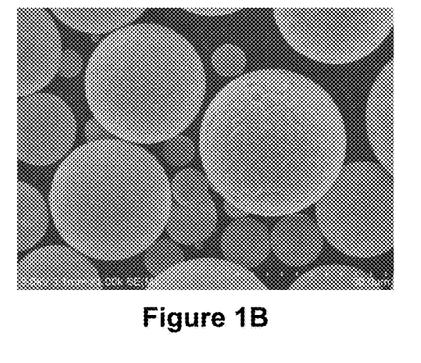

The results are shown in Table 2 for the impurity levels, and in Table 3 for the particle size distribution, and the apparent density and Hall flow rate and FIG. 1B shows a SEM image of the plasma treated powder of Lot A. In each of Lots A, B, and C, the aspect ratio was about 1.0 to 1.1.

TABLE 1

| Feed | Power | Argon gas pressure | Argon Flow - LPM | | | | Hydrogen (LPM) | Plate Voltage (V) | Plate Current (A) | Grid Current (A) | Ta feed rate (kg/hr) |
| | | | Carrier Gas | Shealth Gas | Central Gas | Nozzle | | | | | |
| --- | --- | --- | --- | --- | --- | --- | --- | --- | --- | --- | --- |
| Tantalum | 15 KW | 15 psia | 5 | 30 | 10 | 1 | 4 | 6.55 | 2.3 | 0.4 | 0.75 |

TABLE 2

| | (ppm) | | | | | | | | | | | | |
| Lot | O | N | H | C | S | Cr | Fe | Mg | K | Ni | Na | Ti | W |
| --- | --- | --- | --- | --- | --- | --- | --- | --- | --- | --- | --- | --- | --- |
| A | 310 | 22 | 71 | 11 | <10 | <2 | <3 | <1 | 2 | 25 | 2 | <1 | <1 |
| B | 276 | 40 | 65 | 10 | <10 | <2 | <3 | <1 | 2 | 12 | <1 | <1 | <1 |
| C | 354 | 18 | 70 | 14 | <10 | <2 | <3 | <1 | <1 | 11 | <1 | <1 | <1 |

TABLE 3

| | (microns) | | | Apparent | Hall Flow |
| Lot | D10 | D50 | D90 | Density | (s) |
| --- | --- | --- | --- | --- | --- |
| A | 16.40 | 34.23 | 65.17 | 9.78 | 5.97 |
| B | 20.46 | 39.87 | 71.33 | 9.75 | 5.85 |
| C | 24.38 | 44.06 | 76.44 | 9.58 | 6.34 |

Example 2

Figure 2A:
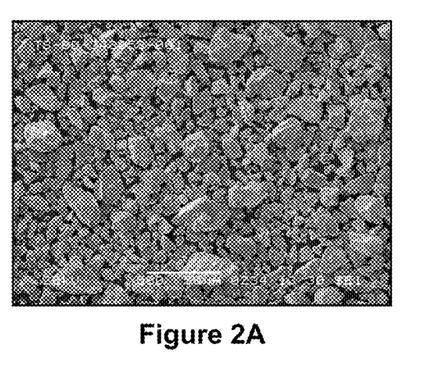
FIG. 2A is a SEM photograph of the starting basic lot tantalum powder used in Example 2 (after being crushed and sieved) and FIG. 2B is a SEM photograph of the finished tantalum powder of Example 2 after plasma treatment.

In this example, basic lot tantalum powder (sodium reduced powder) as in Example 1 was used. This basic lot tantalum powder had a BET of 0.1 $m^2/g$. The basic lot tantalum powder was pressed and sintered into green logs utilizing a sinter temperature of about 1,000 deg C. for one hour. The green logs were fed into an e-beam furnace where the metal was melted via a crucible. The melt was drawn through a die where the tantalum solidified and formed the ingot. The tantalum ingot was hydrided using a high temperature furnace with a hydrogen atmosphere and allowed to cool to room temperature after hydriding. The hydrided ingot was then crushed (using a jaw crush and then a roll crush) and screened to a sieve side of −20 #. The crushed ingot was screened to a desired size cut which was 10-25 microns for Lot A (or 35-75 microns for Lot B). The screened powder for each Lot was then acid leached. The powder was then subjected to deoxidation using magnesium to lower the oxygen levels to below 500 ppm. FIG. 2A shows a SEM of this starting tantalum powder. Each of Lot A and Lot B was then separately subjected to plasma treating in the same manner as Example 1.

Figure 2B:
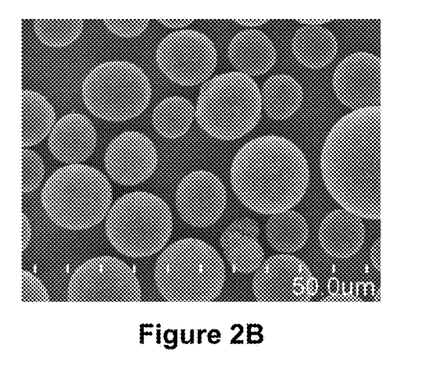

The results are shown in Table 4 for the impurity levels, and in Table 5 for the particle size distribution, and the apparent density and Hall flow rate and FIG. 2B shows a SEM image of the plasma treated powder of Lot A. In each of Lots A and B, the aspect ratio was about 1.0 to 1.1.

TABLE 4

| Lot | (ppm) | | | | | | | | | | | | |
|---|---|---|---|---|---|---|---|---|---|---|---|---|---|
| | O | N | H | C | S | Cr | Fe | Mg | K | Ni | Na | Ti | W |
| A | 633 | 12 | 415 | 15 | <10 | <2 | <3 | <1 | <1 | 20 | 1 | <1 | <1 |
| B | 936 | 54 | 1986 | 21 | <10 | <2 | <3 | <1 | <1 | 10 | 2 | 4 | <1 |

TABLE 5

| Lot | (microns) | | | Apparent Density | Hall Flow (s) |
|---|---|---|---|---|---|
| | D10 | D50 | D90 | | |
| A | 7 | 13 | 21 | 9.3 | 7.3 |
| B | 20 | 40 | 71 | 9.5 | 9.8 |

Example 3

Spherical tantalum powder was produced as in Example 2 and then anodes were formed from the powder by pressing the powder into anodes and sintering and then wet testing was performed showing a capacitance of about 2.5 kCV and electrical leakage of about 0.126 nA/CV In more detail, feed powder used was ingot derived angular Ta powder commercially available from Global Advanced Metals USA, Inc. and known as P400 or P200H2. The angular powder was plasma spheroidized as in Example 1 using a 15 KW plasma source. The powder formed was characterized for gas impurities by LECO gas instruments for carbon, oxygen, nitrogen and hydrogen impurities. Other chemical impurities were characterized via Inductively Coupled Plasma Atomic Emission Spectroscopy (ICP). Particle size was characterized via Horiba Laser Scattering Particle Size Distribution Analyzer. The specific surface area (BET) for the resulting powder was 0.057 m$^2$/g. This measurement is below the specified sensitivity of the instrument at 0.2 m$^2$/g. The powder had a purity of at least 99.995% with total metal impurities of 21 ppm. Low metal impurities allowed the tantalum pentoxide layer formed on the surface of the particles to have fewer defects leading to a lower leakage.

Tables 6 and 7 provide the impurity levels and physical properties of the powder.

TABLE 6

| (ppm) | | | | |
|---|---|---|---|---|
| O | N | H | C | S |
| 856 | 19 | 104 | 14 | <10 |

| (ppm) | | | | | | | |
|---|---|---|---|---|---|---|---|
| Ag | Al | As | B | Bi | Ca | Cd | Co |
| <1 | <2 | <1 | <5 | <1 | <2 | <1 | <1 |
| Cr | Cu | Fe | Ga | Hf | In | Mg | Mn |
| 2 | <1 | 10 | <1 | <1 | <1 | 9 | <1 |
| Mo | K | Ni | Na | Nb | P | Pb | Re |
| <2 | <1 | <1 | <1 | <1 | <3 | <1 | <1 |
| Sb | Se | Si | Sn | Te | Th | Ti | U |
| <1 | <1 | <10 | <1 | <1 | <1 | <1 | <1 |
| V | | W | | Y | | Zr | Zn |
| <1 | | 1 | | <1 | | <1 | <2 |

TABLE 7

| (microns) | | | BET (m$^2$/g) |
|---|---|---|---|
| D10 | D50 | D90 | |
| 8 | 14 | 24 | 0.057 |

Three anodes were produced using a mechanical press. The packing density of the powder was measured and had a Scott Density of 146 g/in$^3$ (Bulk Density of 8.9 g/cm$^3$). The powder was pressed into a pressed body using a press density of 10 g/cm$^3$. The anodes were sintered at 1600° C. for 30 min and passivated slowly for 13 hr. using a 60 cycle method. The anodes were welded to a tree and formed at 100 V in a 0.1% H$_3$PO$_4$ solution. The formed anodes were tested at 70 V (70% of formation voltage (V$_f$)) for capacitance (CV) and leakage measurements. Anode weights were recorded for capacitance per gram calculations. A single anode was removed and cross sectioned to check the structure of the anode.

Metallic and gas impurities in Ta powder have generally shown to increase DC leakage (DCL) in capacitors at End of Life testing. The DCL for these anodes show low leakage values.

Figure 3:
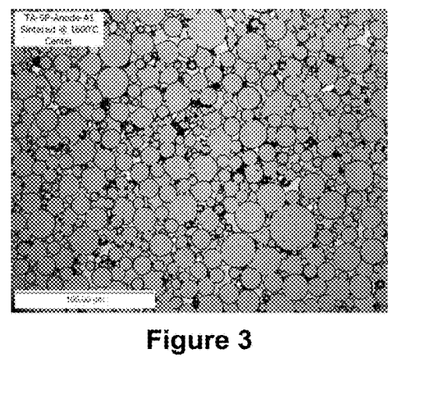
FIG. 3 is a SEM photograph of a section of pressed and sintered anode made with the spherical tantalum powder of the present invention.

FIG. 3 shows the optical microscope cross section of one of the anodes produced. As can be seen, the particles are connected by necks formed during sintering and have open porosity to allow for formation solution to enter the inner anode.

Table 8 provides the capacitance and leakage data for the anodes. The first two anodes have similar capacitance and leakage numbers but the third anode has unexpectedly low capacitance, but this anode was damaged and therefore the data is not representative of the anodes formed. The mass used to calculate specific capacitance CV/g was measured from a single anode and used to calculate capacitance for all three.

TABLE 8

| Anode No. | DC Charge Voltage (V) | DC Leakage, (μA) | Capacitance in (μF) | Anode Mass (g) | Capacitance (CV/g) | Leakage (nA/CV) |
|---|---|---|---|---|---|---|
| 1 | 70 | 0.565 | 45.08 | 1.5094 | 2987 | 0.125 |
| 2 | 70 | 0.545 | 42.39 | 1.5094 | 2808 | 0.129 |
| 3 | 70 | 0.370 | 30.10 | 1.5094 | 1994 | 0.123 |
| Average | 70 | 0.493 | 39.19 | 1.5094 | 2596 | 0.126 |

The present invention includes the following aspects/embodiments/features in any order and/or in any combination:

1. A capacitor anode comprising a powder that is pressed and sintered, wherein said powder comprises a spherical powder that is a metal or metal sub-oxide or both, said spherical powder comprising
   a. a spherical shape wherein the powder has an average aspect ratio of from 1.0 to 1.4;
   b. a purity of at least 99.5 wt %;
   c. an average particle size of from about 0.5 micron to about 250 microns;
   d. an apparent density from about 1.5 g/cc to about 15.5 g/cc such as from about 4 g/cc to about 12.3 g/cc;
   e. a true density that is within +−3% of the metal or metal sub-oxide; and
   f. a Hall flow rate of 40 sec or less.
2. The capacitor anode of any preceding or following embodiment/feature/aspect, wherein said spherical metal powder is plasma heat-treated or gas atomized.
3. The capacitor anode of any preceding or following embodiment/feature/aspect, wherein said metal powder has an oxygen level of from 50 ppm to 15,000 ppm or from 400 ppm to 15,000 ppm.
4. The capacitor anode of any preceding or following embodiment/feature/aspect, wherein said metal powder has an oxygen level of 50 ppm to 10,000 ppm.
5. The capacitor anode of any preceding or following embodiment/feature/aspect, wherein said average aspect ratio is from 1.0 to 1.25.
6. The capacitor anode of any preceding or following embodiment/feature/aspect, wherein said average aspect ratio is from 1.0 to 1.1.
7. The capacitor anode of any preceding or following embodiment/feature/aspect, wherein said purity is at least 99.99 wt %.
8. The capacitor anode of any preceding or following embodiment/feature/aspect, wherein said average particle size is from about 0.5 micron to about 10 microns.
9. The capacitor anode of any preceding or following embodiment/feature/aspect, wherein said average particle size is from about 5 microns to about 25 microns.
10. The capacitor anode of any preceding or following embodiment/feature/aspect, wherein said average particle size is from about 15 microns to about 45 microns.
11. The capacitor anode of any preceding or following embodiment/feature/aspect, wherein said average particle size is from about 35 microns to about 75 microns.
12. The capacitor anode of any preceding or following embodiment/feature/aspect, wherein said average particle size is from about 55 microns to about 150 microns.
13. The capacitor anode of any preceding or following embodiment/feature/aspect, wherein said average particle size is from about 105 microns to about 250 microns.
14. The capacitor anode of any preceding or following embodiment/feature/aspect, wherein said powder has at least one of the following properties:
   a. a D10 size of from about 5 microns to 25 microns; or
   b. a D90 size of from about 20 microns to 80 microns.
15. The capacitor anode of any preceding or following embodiment/feature/aspect, wherein said powder is selected from niobium, tantalum, conductive niobium sub-oxide, or any combination thereof.
16. The capacitor anode of any preceding or following embodiment/feature/aspect, wherein said powder further comprises non-spherical powder comprising a metal or conductive metal sub-oxide or both.
17. The capacitor anode of any preceding or following embodiment/feature/aspect, wherein said non-spherical powder comprises angular powder, flake powder, nodular powder.
18. The capacitor anode of any preceding or following embodiment/feature/aspect, wherein said powder comprises from 1% to 99% by weight of said spherical powder and from 1% to 99% by weight of said non-spherical powder.
19. The capacitor anode of any preceding or following embodiment/feature/aspect, wherein said powder comprises from 25% to 75% by weight of said spherical powder and from 25% to 75% by weight of said non-spherical powder.
20. The capacitor anode of any preceding or following embodiment/feature/aspect, wherein said powder comprises from 50% to 99% by weight of said spherical powder and from 1% to 50% by weight of said non-spherical powder.
21. The capacitor anode of any preceding or following embodiment/feature/aspect, wherein said powder comprises from 75% to 99% by weight of said spherical powder and from 1% to 25% by weight of said non-spherical powder.
22. The capacitor anode of any preceding or following embodiment/feature/aspect, wherein said spherical powder comprises at least two different size fractions based on average particle size.
23. The capacitor anode of any preceding or following embodiment/feature/aspect, wherein said spherical powder comprises a first size fraction having an average particle size from about 10 microns to about 25 microns, and a second size fraction of from about 26 microns to about 45 microns.
24. The capacitor anode of any preceding or following embodiment/feature/aspect, wherein the capacitor anode has a capacitance (CV) of from 1,000 μF-V/g to 100,000 μF-V/g, and a leakage current of 6 nA/μFV or less.
25. The capacitor anode of any preceding or following embodiment/feature/aspect, wherein the capacitor anode can be formed at a formation voltage of from 10 V to 1000 V.
26. An electrolytic capacitor comprising the capacitor anode of any preceding or following embodiment/feature/aspect.
27. A method to make to the capacitor anode of any preceding or following embodiment/feature/aspect, said method comprising:
   a. plasma heat-treating a starting powder to at least partially melt at least an outer surface of said starting powder in an inert atmosphere to obtain a heat-treated powder, wherein said starting powder is a metal or conductive metal sub-oxide or both,
b. cooling said heat-treated powder in an inert atmosphere to obtain said spherical powder;
c. pressing said spherical powder to form a pressed body;
d. sintering said pressed body one or more times to form a sintered body; and
e. anodizing the sintered body in an electrolyte to form a dielectric oxide film on the sintered body to form said capacitor anode.

28. The method of any preceding or following embodiment/feature/aspect, wherein said starting powder is sodium-reduced tantalum powder.

29. The method of any preceding or following embodiment/feature/aspect, wherein said starting powder is a basic lot tantalum powder.

30. The method of any preceding or following embodiment/feature/aspect, wherein said starting powder has a first particle size distribution, and said powder has a second particle size distribution, and said first particle size distribution and said second particle size distribution are within 10% of each other.

31. The method of any preceding or following embodiment/feature/aspect, wherein prior to step a, the starting powder is formed by sintering a first powder to obtain a sintered powder, and then e-beam melting of said sintered powder to obtain an ingot, and then reducing said ingot to said starting powder.

32. A metal or metal sub-oxide powder comprising
a. a spherical shape wherein the powder has an average aspect ratio of from 1.0 to 1.4;
b. a purity of at least 99.5 wt % based on total weight of said powder, excluding gas impurities;
c. an average particle size of from about 0.5 micron to about 250 microns;
d. an apparent density from about 1.5 g/cc to about 15.5 g/cc, such as from about 4 g/cc to about 12.3 g/cc;
e. a true density that is within +−3% of the metal or metal sub-oxide; and
f. a Hall flow rate of 40 sec or less.

33. A sintered pellet comprising a metal powder that is shaped in the form of a pellet and sintered, wherein said metal powder comprises the metal powder of any preceding or following embodiment/feature/aspect.

The present invention can include any combination of these various features or embodiments above and/or below as set forth in sentences and/or paragraphs. Any combination of disclosed features herein is considered part of the present invention and no limitation is intended with respect to combinable features.

Applicant specifically incorporates the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A capacitor anode comprising a powder that is pressed and sintered, wherein said powder comprises a spherical powder that is a metal or metal sub-oxide or both, said spherical powder comprising
a. a spherical shape wherein the powder has an average aspect ratio of from 1.0 to 1.4;
b. a purity of at least 99.5 wt %;
c. an average particle size of from about 0.5 micron to about 250 microns;
d. an apparent density from about 1.5 g/cc to about 15.5 g/cc;
e. a true density that is within +−3% of the metal or metal sub-oxide; and
f. a Hall flow rate of 40 sec or less,
wherein said powder is selected from niobium, tantalum, conductive niobium sub-oxide, or any combination thereof.

2. A metal or metal sub-oxide powder comprising
a. a spherical shape wherein the powder has an average aspect ratio of from 1.0 to 1.4;
b. a purity of at least 99.5 wt % based on total weight of said powder, excluding gas impurities;
c. an average particle size of from about 0.5 micron to about 250 microns;
d. an apparent density from about 1.5 g/cc to about 15.5 g/cc;
e. a true density that is within +−3% of the metal or metal sub-oxide; and
f. a Hall flow rate of 40 sec or less, wherein said metal or metal sub-oxide powder is tantalum, niobium, silicon, titanium, chromium, nickel, copper, zinc, zirconium, molybdenum, silver, gold, tungsten, or rhenium or an alloy thereof.

3. The metal or metal sub-oxide powder of claim 2, wherein said metal or metal sub-oxide powder is of the formula $NbO_x$, wherein x is 0.7 to 1.2.

4. The metal or metal sub-oxide powder of claim 2, wherein said metal or metal sub-oxide powder is NbO, $NbO_{1.1}$, $NbO_{0.8}$, $NbO_{0.9}$.

5. The metal or metal sub-oxide powder of claim 2, wherein said metal or metal sub-oxide powder is said alloy.

6. The metal or metal sub-oxide powder of claim 5, wherein said alloy is Ta—Ti alloy or a Ta—Si alloy or Ta—W alloy or Ta—Mo alloy or Ta—Nb alloy.

7. The metal or metal sub-oxide powder of claim 5, wherein said alloy is a Ta-metal alloy.

8. The metal or metal sub-oxide powder of claim 5, wherein said alloy is a Ta—Nb—Ti alloy.

9. The metal or metal sub-oxide powder of claim 5, wherein said alloy is a Ta-metal alloy wherein the Ta is present in the highest percent based on the weight of the alloy.

10. The metal or metal sub-oxide powder of claim 2, wherein said metal or metal sub-oxide powder is doped with one or more dopants.

11. The metal or metal sub-oxide powder of claim 10, wherein said one or more dopants is nitrogen, phosphorous, yittrium, or silica.

12. The metal or metal sub-oxide powder of claim 2, wherein said metal or metal sub-oxide powder has one or more of the following properties:

a) said apparent density of from 4 g/cc to 12.3 g/cc,
   b) a D10 particle size of from about 5 microns to about 25 microns,
   c) a D50 particle size of from about 20 microns to about 50 microns,
   d) a D90 particle size of from about 30 microns to about 100 microns, and/or
   e) a BET surface area of from about 0.05 m²/g to about 20 m²/g.

13. The metal or metal sub-oxide powder of claim 12, wherein two or more of said one or more properties are present.

14. The metal or metal sub-oxide powder of claim 2, wherein said metal or metal sub-oxide powder has one or more of the following properties:
   a) an apparent density of from about 9 g/cc to about 12.3 g/cc,
   b) a D10 particle size of from about 12 microns to about 25 microns,
   c) a D50 particle size of from about 20 microns to about 40 microns,
   d) a D90 particle size of from about 30 microns to about 70 microns, and/or
   e) a BET surface area of from about 0.1 m²/g to about 15 m²/g.

15. The metal or metal sub-oxide powder of claim 12, wherein said metal or metal sub-oxide powder has all of said one or more of the properties.

16. The metal or metal sub-oxide powder of claim 14, wherein said metal or metal sub-oxide powder has all of said one or more of the properties.

17. The metal or metal sub-oxide powder of claim 2, wherein said metal or metal sub-oxide powder has an oxygen level of less than 15,000 ppm.

18. The metal or metal sub-oxide powder of claim 2, wherein said metal or metal sub-oxide powder has an oxygen level of from 20 ppm to 250 ppm.

19. The metal or metal sub-oxide powder of claim 2, wherein said average aspect ratio is from 1.0 to 1.1.

20. The metal or metal sub-oxide powder of claim 2, wherein said average aspect ratio is from 1.0 to 1.05.

21. The metal or metal sub-oxide powder of claim 2, wherein said average particle size is from about 0.5 micron to about 10 microns.

22. The metal or metal sub-oxide powder of claim 2, wherein said average particle size is from about 5 microns to about 25 microns.

23. The metal or metal sub-oxide powder of claim 2, wherein said average particle size is from about 15 microns to about 45 microns.

24. The metal or metal sub-oxide powder of claim 2, wherein said average particle size is from about 35 microns to about 75 microns.

25. The metal or metal sub-oxide powder of claim 2, wherein said average particle size is from about 55 microns to about 150 microns.

26. The metal or metal sub-oxide powder of claim 2, wherein said average particle size is from about 105 microns to about 250 microns.

27. The metal or metal sub-oxide powder of claim 2, wherein said metal or metal sub-oxide powder has at least one of the following properties:
   a. a D10 size of from about 5 microns to 25 microns;
   b. a D90 size of from about 20 microns to 80 microns; or
   c. oxygen between 100 ppm to 1000 ppm.

28. The metal or metal sub-oxide powder of claim 2, wherein said apparent density is from about 4 g/cc to about 12.6 g/cc.

29. The metal or metal sub-oxide powder of claim 2, wherein said apparent density is from about 4.5 g/cc to about 12 g/cc.

30. The metal or metal sub-oxide powder of claim 2, wherein said apparent density is from about 5 g/cc to about 10 g/cc.

31. The metal or metal sub-oxide powder of claim 2, wherein said apparent density is from about 6 g/cc to about 12.5 g/cc.

32. The metal or metal sub-oxide powder of claim 2, wherein said true density is within 2% of said metal or metal sub-oxide.

33. The metal or metal sub-oxide powder of claim 2, wherein said true density is within 1% of said metal or metal sub-oxide.

34. The metal or metal sub-oxide powder of claim 2, wherein said Hall flow rate is 30 sec or less.

35. The metal or metal sub-oxide powder of claim 2, wherein said Hall flow rate is 20 sec or less.

36. The metal or metal sub-oxide powder of claim 2, wherein said Hall flow rate is from 4 to 40 sec.

37. The metal or metal sub-oxide powder of claim 2, wherein said Hall flow rate is from 4 to 15 sec.

38. The metal or metal sub-oxide powder of claim 2, wherein said average aspect ratio is from 1.0 to 1.1; said true density is within +−1% of the metal or metal sub-oxide; and said Hall flow rate is 20 sec or less.

39. The metal or metal sub-oxide powder of claim 2, wherein said metal or metal sub-oxide powder comprises at least two different size fractions, wherein the size fraction is based on average particle size of the size fraction.

40. The metal or metal sub-oxide powder of claim 39, wherein said metal or metal sub-oxide powder comprises a first size fraction having an average particle size from about 10 microns to about 25 microns, and a second size fraction of from about 26 microns to about 45 microns.

41. The metal or metal sub-oxide powder of claim 39, wherein said metal or metal sub-oxide powder comprises a first size fraction of from about 0.5 micron to about 15 microns, and a second size fraction of from about 35 microns to about 75 microns.

42. A powder blend comprising a) a spherical powder that is the metal or metal sub-oxide powder of claim 2 and b) non-spherical powder selected from one or more non-spherical metal powders and/or non-spherical metal sub-oxide powders.

43. The powder blend of claim 42, wherein the non-spherical powder is an angular powder, a flake powder, and/or a nodular powder, or any combinations thereof.

44. The powder blend of claim 42, wherein the powder blend has from 25% to 75% by weight of the spherical powder and from 25% to 75% by weight of the non-spherical powder.

45. The powder blend of claim 42, wherein the powder blend has from 50% to 99% by weight of the spherical powder and from 1% to 50% by weight of the non-spherical powder.

46. The powder blend of claim 42, wherein the powder blend has from 75% to 99% by weight of the spherical powder and from 1% to 25% by weight of the non-spherical powder.

47. A metal or metal sub-oxide powder comprising
   a. a spherical shape wherein the powder has an average aspect ratio of from 1.0 to 1.4;

b. a purity of at least 99.5 wt % based on total weight of said powder, excluding gas impurities;
c. an average particle size of from about 0.5 micron to about 250 microns;
d. an apparent density from about 1.5 g/cc to about 15.5 g/cc;
e. a true density that is within +−3% of the metal or metal sub-oxide; and
f. a Hall flow rate of 40 sec or less, wherein said metal or metal sub-oxide powder is a valve metal.

* * * * *